United States Patent Office 3,755,516
Patented Aug. 28, 1973

3,755,516
METHODS OF EXTRUDING PLASTIC MATERIAL
Zbigniew Bonikowski, London, and Bruce Henry Keen, Hounslow, Middlesex, England, assignors to British Insulated Callender's Cables Limited, London, England
Filed Aug. 21, 1970, Ser. No. 65,980
Claims priority, application Great Britain, Aug. 25, 1969, 42,224/69
Int. Cl. B29d 27/00; B29f 3/00
U.S. Cl. 264—40                     11 Claims

ABSTRACT OF THE DISCLOSURE

The rate of feed of plastic material into a screw extruder is controlled in accordance with the internal pressure at at least one point along the extruder barrel by sampling the pressure measurement at one point in, or at each of several spaced points along, the extruder barrel at intervals under the control of a timing device driven by the extruder screw in such a way that each sample is taken from the same part of the pressure cycle. Pressure samples are compared with a reference signal to produce an error signal when the value of one or more pressure samples deviates from a desired value. These error signals, which may themselves be sampled under the control of the timing device to avoid hunting, are caused to adjust the rate of feed of material to the extruder, e.g. from a second screw extruder, to restore the pressure to the desired value.

---

Figure 1:
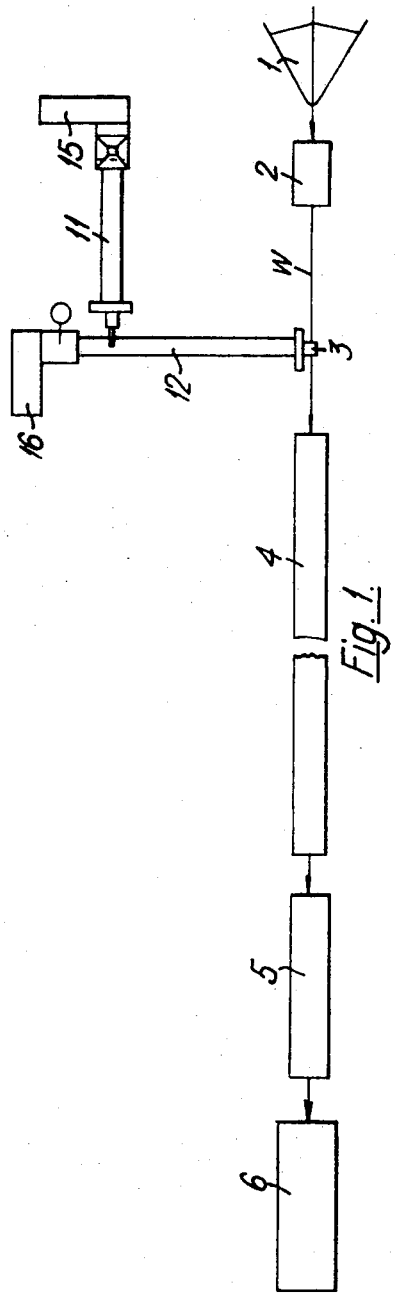

This invention relates to a method of extruding plastic material, especially rubber and plastics, and more particularly to a method of controlling the rate of feed of material into a screw-type extrusion machine (hereinafter referred to as an "extruder") in accordance with the internal pressure at one or more points along the barrel of the extruder.

A difficulty entailed in using a measurement of the internal pressure at a point along the extruder barrel to effect such control is that the internal pressure fluctuates substantially in synchronism with the rotation of the extruder screw and an object of the invention is to provide a control system that operates effectively and without objectionable hunting in spite of such fluctuations.

In the method in accordance with the invention, the pressure measurement at a single point in the extruder barrel (or the measurement at each of a number of points spaced along the barrel) is sampled at intervals under the control of a timing device driven by the extruder screw in such a way that each sample from a measurement point is taken from the same part of the pressuure cycle; pressure samples are compared with a reference signal to produce an error signal when the value of one or more pressure samples deviates from a desired value; and the error signals are caused to adjust the rate of feed of material to the extruder to restore the pressure to the desired value.

Each of the pressure samples taken may be compared with the reference signal but, for accuracy of operation, it is preferred either to take the mean of a number of pressure samples and to compare the mean of these samples with a reference signal to produce an error signal when this mean value deviates from the desired value, or to summate a number of pressure samples and to compare the summation with a reference signal to produce an error signal when the value of the summation deviates from a predetermined desired value for the summation of a like number of pressuure samples.

When pressure measurements are taken at a single point only in the extruder barrel, in order to prevent hunting it is preferable also to sample the error signals, under the control of the same timing device. In other words, error signals are selected at intervals such that an adjustment made to the feed rate is response to a selected error signal will have taken effect wholly or to a substantial extent before another is selected.

The method in accordance with the invention is especially applicable to extruders for producing cellular plastics material by a gas injection process, for example the process which is the subject of co-pending application No. 46,885 filed on June 17, 1970 in the joint names of H. E. Gallard, G. A. Layzell-Ward, B. G. Howell and A. H. Hill which application is assigned to the assignee of the present application.

In such method the same extruder is used both for dissolving gas in the material and for metering the material to an extrusion die which forms the outlet of the extruder and in which a cellular shaped body is produced, for example an annular layer of cellular insulation is extruded around a cable conductor passed through the extrusion head of the extruder.

When cellular plastics material is being produced in such an extruder the material is preferably fed in a molten condition into the extruder barrel and worked and advanced to a partly-filled zone (hereinafter referred to as the "gas injection zone") in which it is subjected to gas pressure and then advanced to a substantially fully-filled zone (hereinafter referred to as the "extrusion zone") from which it is extruded. In the gas injection zone the extruder screw has a smaller root diameter than in the extrusion zone.

The gas injection zone must be filled partly with the material and partly with gas so that there is a sufficient area of contact between them to allow an adequate quantity of the gas to be dissolved, whereas the extrusion zone must be substantially completely filled with the plastics material containing dissolved gas.

The pressure in the extrusion zone is at a maximum near the extrusion head and drops gradually towards a transition zone between the extrusion and gas injection zones, in which the pressure approximates to that at which the gas is pumped into the barrel.

In the process in accordance with the present invention, the pressure in the barrel is measured at one or more points in or adjacent to the transition zone, preferably nearer to rather than farther from the extrusion head than the transition zone and preferably at a point where the optimum pressure is about one third of the maximum pressure in the extrusion zone.

The preferred method of feeding molten material into the gas injection extruded is by means of another extruder, the speed of which can be controlled to control the rate of feed of plastic material into the gas injection extruder. In this feed extruder the material is melted and mixed to the required consistency.

Figure 2:
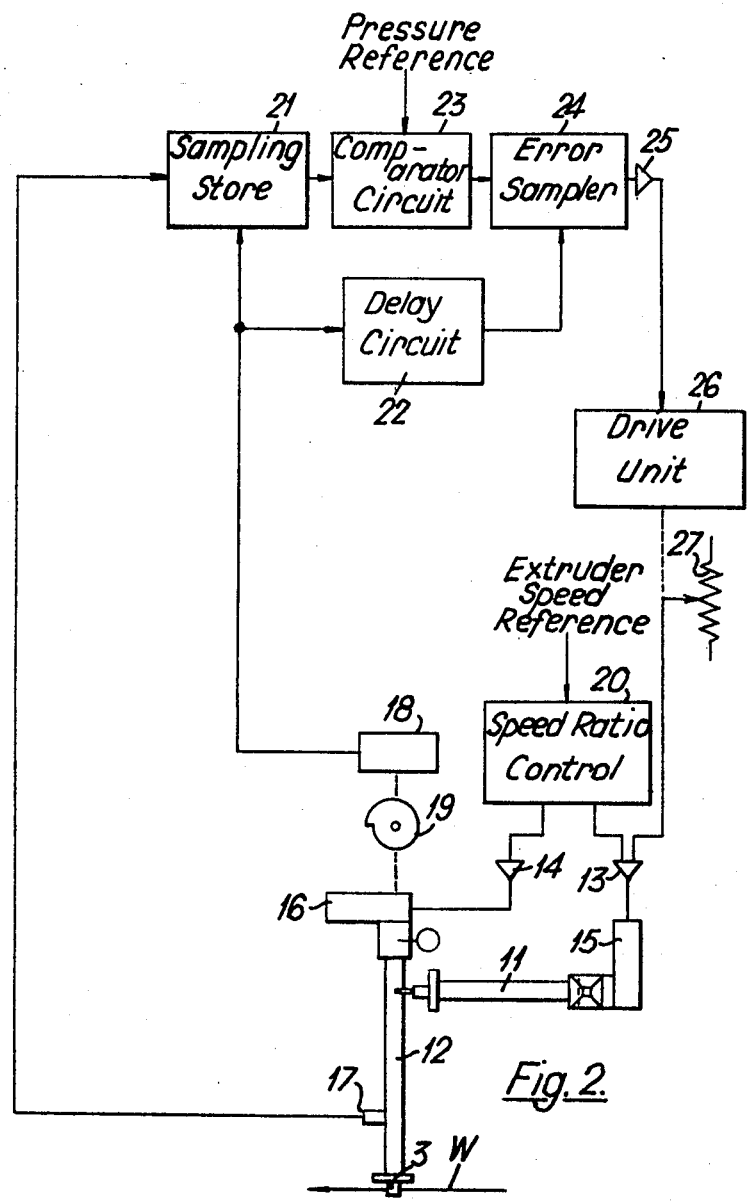

The invention will be further illustrated by a description by way of example and with reference to the accompanying diagrammatic drawings of apparatus in accordance with the present invention for producing a layer of cellular polyethylene on a wire advancing in the direction of its length, which apparatus is suitable for use in a process in accordance with the above mentioned co-pending application. In the accompanying drawings:

FIG. 1 is a diagrammatic plan view of the layout of the plant for use in the extrusion of a layer of cellular polyethylene on to a wire, and FIG. 2 is a diagram of apparatus in accordance with the present invention for controlling the rate of feed of polyethylene into the gas injection extruder of the plant shown in FIG. 1.

Referring to FIG. 1 the plant comprises a pay off unit 1, from which wire W is drawn through a wire preheating device 2 into the cross-head die 3 of the second of two screw extruders 11 and 12, which extruder constitutes the gas injection extruder, where a layer of cellular polyethylene is applied to the wire. On emerging from the die 3 the cellular polyethylene-covered wire passes through a cooling trough 4 or other cooling the extruded layer of cellular polyethylene and from the cooling trough the covered wire travels past or through several quality control instruments generally indicated at 5 and is wound on a take-up drum 6 or is coiled in a container.

The first extruder 11 of the two screw extruders is a conventional polyethylene extruder whose function is to melt and blend the polymer and pump it at a controlled temperature to the second or gas injection extruder 12 which is mounted at 90° to the first extruder and in which the gas is injected into the polymer. The two screw extruders 11 and 12 are separately driven by drive units 15 and 16.

Referring to FIG. 2, the relative speeds of the drive units 15 and 16 are preset by an extruder speed reference signal and control circuit 20 in accordance with variable parameters, such as the extrusion temperature and the amount of gas required to be injected into the polyethylene in the extruder 12, which signal is fed through amplifiers 13 and 14 to the drive units. The pressure in the barrel of extruder 12 is measured at one or more points in or adjacent to the transition zone by means of pressure probes 17, for convenience one probe only being illustrated.

The apparatus includes a timing circuit comprising a cam-operated switch 18 the cam 19 of which is mounted on the shaft of extruder 12. Signals from the switch 18 are fed both to a sampling store 21 and to a distance delay circuit 22. The pressure probe 17 is also connected to the sampling store 21, which is adjusted to take samples from the rising portion of the saw-tooth wave form of the pressure signal obtained from the pressure probe and to summate a predetermined number, for instance twenty, of such samples.

The output of the sampling store 21 corresponding to said summation is fed through a comparator circuit 23, also fed with a pressure reference signal corresponding to the desired value for the summation of a like number of sample, to an error sampler 24 controlled by the output of the distance delay circuit 22. As already mentioned, the error signals are sampled at predetermined intervals to avoid hunting. The selected error signals are fed through an amplifier 25 to a drive unit 26 which drives the moving contact of a potentiometer 27 or other adjustable control means to produce a speed correction signal which is fed through the amplifier 13 to the drive unit 15. The moving contact of the potentiometer 27 is driven for a fixed period of time at a speed proportional to the pressure error.

The distance delay circuit 22 selects errors at intervals of a number of revolutions of the screw of extruder 12 such that, when a correction is initiated by an error signal, most of its effect (for example 90%) will become apparent before another error signal is sampled.

What we claim as our invention is:

1. A method of controlling the rate of feed of plastic material into a screw extruder in accordance with the internal pressure of at least one point along the barrel of the extruder, which method comprises sampling the pressure measurement at at least one point in the extruder barrel at intervals under the control of a timing device driven by the extruder screw in such a way that each sample from a measurement point is taken from the same part of the pressure cycle; comparing the pressure samples with a reference signal to produce an error signal when the value of at least one pressure sample deviates from a desired value; and adjusting the rate of feed of material to the extruder in response to said error signals to restore the pressure to the desired value.

2. A method as claimed in claim 1, wherein the pressure measurement is sampled at each of a number of points spaced along the barrel.

3. A method as claimed in claim 1, wherein molten plastics material is fed into the extruder by means of another extruder, the speed of which is controlled to control the rate of feed of plastics material.

4. A method as claimed in claim 1, wherein the mean of a number of pressure samples is taken and is compared with a reference signal to produce an error signal when said mean value deviates from the desired value.

5. A method as claimed in claim 1, wherein a number of pressure samples are summated and the summation is compared with a reference signal to produce an error signal when the value of the summation deviates from a predetermined desired value for the summation of a like number of pressure samples.

6. A method of controlling the rate of feed of plastic material into a screw extruder in accordance with the internal pressure at at least one point along the barrel of the extruder, which method comprises sampling the pressure measurement at a single point in the extruder barrel at intervals under the control of a timing device driven by the extruder screw in such a way that each sample from the measurement point is taken from the same part of the pressure cycle; comparing the pressure samples with a reference signal to produce an error signal when the value of at least one pressure sample deviates from a desired value; sampling the error signals under the control of said timing device; and adjusting the rate of feed of material to the extruder in response to said samples of the error signals to restore the pressure to the desired value.

7. A method of controlling the rate of feed of plastic material into a screw extruder in accordance with the internal pressure at at least one point along the barrel of the extruder, which extruder is producing cellular plastics material by a process in which plastics material in the extruder barrel is worked and advanced to a gas injection zone in which it is subjected to gas under pressure that is injected into the barrel and is dissolved in the plastics material, and the plastics material is then advanced to an extrusion zone from which it is extruded, which method comprises sampling the pressure measurement at at least one point in the region of a transition zone in the extruder barrel between the extrusion and gas injection zones at intervals under the control of a timing device driven by the extruder screw in such a way that each sample from a measurement point is taken from the same part of the pressure cycle; comparing the pressure samples with a reference signal to produce an error signal when the value of at least one pressure sample deviates from a desired value; and adjusting the rate of feed of material to the extruder in response to said error signals to restore the pressure to the desired value.

8. A method as claimed in claim 7, wherein a pressure measurement is taken at a single point in the region of the transition zone, the error signals are sampled under the control of said timing device and the samples of the error signals are caused to adjust the rate of feed of material to the extruder.

9. A method as claimed in claim 7, wherein at least one of a plurality of points at which the pressure is measured is nearer the extrusion head than the transition zone.

10. A method as claimed in claim 9, wherein the pressure is measured at a point where the optimum pressure is about one-third of the maximum pressure in the extrusion zone.

11. A method as claimed in claim 7, wherein molten plastics material is fed into the extruder by means of another extruder, the speed of which is controlled to control the rate of feed of plastics material.

References Cited
UNITED STATES PATENTS

| | | | |
|---|---|---|---|
| 3,391,232 | 7/1968 | Jackson | 264—40 |
| 3,499,952 | 3/1970 | Kolner et al. | 264—40 |
| 3,388,196 | 6/1968 | Farrell | 264—176 R X |
| 3,357,049 | 12/1967 | Spindler | 18—2 HA X |
| 3,316,335 | 4/1967 | Snella et al. | 264—176 R X |
| 2,836,851 | 6/1958 | Holt | 264—176 R UX |

ROBERT F. WHITE, Primary Examiner

J. H. SILBAUGH, Assistant Examiner

U.S. Cl. X.R.

264—50, 176 R; 425—145